US009344458B2

(12) United States Patent
Hubler et al.

(10) Patent No.: US 9,344,458 B2
(45) Date of Patent: May 17, 2016

(54) PROVIDING UNIFIED COMMUNICATIONS SERVICES

(71) Applicant: eZuce, Inc., Andover, MA (US)

(72) Inventors: Douglas Hubler, Andover, MA (US); George Niculae, Bucharest (RO); Joegen Baclor, Pasig (PH); Mircea-Mihai Cărăşel, Bucharest (RO); Cristian-Alexandru Starasciuc, Bucharest (RO); Laurenţiu-Marian Ceauşescu, Bucharest (RO); Martin Steinmann, Newburyport, MA (US)

(73) Assignee: eZuce, Inc., Andover, MA (US)

( * ) Notice: Subject to any disclaimer, the term of this patent is extended or adjusted under 35 U.S.C. 154(b) by 201 days.

(21) Appl. No.: 13/841,869

(22) Filed: Mar. 15, 2013

(65) Prior Publication Data

US 2014/0019626 A1    Jan. 16, 2014

Related U.S. Application Data

(60) Provisional application No. 61/672,119, filed on Jul. 16, 2012.

(51) Int. Cl.
*G06F 15/16* (2006.01)
*H04L 29/06* (2006.01)
*H04L 29/08* (2006.01)

(52) U.S. Cl.
CPC ........ *H04L 65/1006* (2013.01); *H04L 65/1069* (2013.01); *H04L 65/80* (2013.01); *H04L 67/24* (2013.01); *H04L 67/1004* (2013.01)

(58) Field of Classification Search
CPC .. H04L 65/10–65/1096; H04L 67/10–67/1097
USPC ................. 709/204–207, 227–239
See application file for complete search history.

(56) References Cited

U.S. PATENT DOCUMENTS 7,020,707 B2    3/2006  Sternagle
7,657,021 B2    2/2010  Flockhart et al.
(Continued)

FOREIGN PATENT DOCUMENTS

WO    2012060747    5/2012

OTHER PUBLICATIONS

Schumann, Sebastian, Michael Maruschke, and Eugen Mikoczy. "The Potential of Consolidating SIP and XMPP Based Communication for Telecommunication Carriers." Testbeds and Research Infrastructures. Development of Networks and Communities. Springer Berlin Heidelberg, 2011. 713-726.*
(Continued)

*Primary Examiner* — David Lazaro
*Assistant Examiner* — Julian Chang
(74) *Attorney, Agent, or Firm* — Proskauer Rose LLP (57) ABSTRACT

Methods and apparatuses, including computer program products, are described for providing unified communication services for communication sessions between client devices. A plurality of globally-distributed computing device clusters are coupled to each other over a communication network. Each cluster is configured to receive, from a client device, a transaction request associated with a communication session, including a presence event. Each cluster comprises a SIP server configured to process the transaction request, an event queue configured to extract the presence event from the transaction request for storage in the event queue, and a session state handler configured to retrieve the presence event from the event queue and notify an XMPP server of the presence event. The SIP server, XMPP server, and session state handler each stores and retrieves data associated with the communication session in a database shard at the cluster. The shards of each cluster collectively comprise a single logical database.

23 Claims, 5 Drawing Sheets

(56) References Cited

U.S. PATENT DOCUMENTS

| | | |
|---|---|---|
| 8,234,390 B2 | 7/2012 | Shanmugham |
| 2004/0197079 A1 | 10/2004 | Latvala et al. |
| 2004/0228469 A1* | 11/2004 | Andrews et al. ......... 379/265.03 |
| 2007/0168421 A1* | 7/2007 | Kalyanpur et al. ............ 709/204 |
| 2008/0159271 A1* | 7/2008 | Kutt et al. ...................... 370/352 |
| 2009/0031032 A1* | 1/2009 | Shanmugham ............... 709/229 |
| 2009/0245267 A1* | 10/2009 | Igarashi et al. ............... 370/401 |
| 2009/0327494 A1* | 12/2009 | Ben-Ezra et al. ............. 709/226 |
| 2010/0177766 A1* | 7/2010 | daCosta et al. ............... 370/352 |
| 2010/0306119 A1* | 12/2010 | Banerjee et al. .............. 705/319 |
| 2011/0138054 A1* | 6/2011 | Ben-Ezra et al. ............. 709/226 |
| 2011/0219121 A1* | 9/2011 | Ananthanarayanan et al. .............................. 709/227 |
| 2011/0268105 A1* | 11/2011 | Weiser et al. ................. 370/352 |
| 2011/0295957 A1* | 12/2011 | Ananthanarayanan et al. .............................. 709/206 |
| 2012/0092439 A1* | 4/2012 | Mackie et al. ............. 348/14.06 |
| 2012/0124413 A1* | 5/2012 | Bauer et al. .................. 714/4.11 |
| 2012/0135717 A1* | 5/2012 | Fiedorowicz et al. ..... 455/414.1 |
| 2012/0144052 A1* | 6/2012 | Zhong ........................... 709/230 |
| 2012/0173252 A1* | 7/2012 | Mak et al. ...................... 705/1.1 |
| 2012/0226797 A1* | 9/2012 | Ghosh et al. .................. 709/224 |
| 2012/0254175 A1* | 10/2012 | Horowitz et al. ............. 707/737 |
| 2012/0258712 A1* | 10/2012 | Rozinov .................... 455/435.1 |
| 2012/0268061 A1* | 10/2012 | Bhageria et al. ............... 320/107 |
| 2012/0278473 A1* | 11/2012 | Griffiths ........................ 709/224 |
| 2012/0304245 A1* | 11/2012 | Lawson et al. .................... 726/1 |
| 2012/0321057 A1* | 12/2012 | Goodman et al. ......... 379/90.01 |
| 2013/0063272 A1* | 3/2013 | Bhageria et al. ............... 340/650 |
| 2013/0063273 A1* | 3/2013 | Bhageria et al. ............... 340/653 |
| 2013/0066481 A1* | 3/2013 | Bhageria et al. ............... 700/297 |
| 2013/0072153 A1* | 3/2013 | Lawson et al. ................. 455/410 |
| 2013/0120105 A1* | 5/2013 | Bhageria et al. ................. 340/3.1 |
| 2013/0124001 A1* | 5/2013 | Bhageria et al. ............... 700/296 |
| 2013/0165171 A1* | 6/2013 | Pai et al. ........................ 455/518 |
| 2013/0245843 A1* | 9/2013 | Bhageria et al. ............... 700/287 |
| 2014/0032579 A1* | 1/2014 | Merriman et al. ............. 707/756 |
| 2014/0044123 A1* | 2/2014 | Lawson et al. ................. 370/352 |
| 2014/0067911 A1* | 3/2014 | Block et al. ................... 709/203 |
| 2014/0095602 A1* | 4/2014 | Sheppard ....................... 709/204 |
| 2014/0156728 A1* | 6/2014 | Gangadharan et al. ....... 709/203 |
| 2014/0258255 A1* | 9/2014 | Merriman et al. ............ 707/704 |

OTHER PUBLICATIONS

Balasubramanian, "A Scalable Architecture for SIP using Content Addressable Networks. (Under the direction of Dr. Injong Rhee)," A thesis submitted in partial fulfillment of the requirements for the degree of Master of Science, North Carolina State University, May 2004, 59 pages.

\* cited by examiner

PROVIDING UNIFIED COMMUNICATIONS SERVICES

RELATED APPLICATIONS

This application claims priority to U.S. Provisional Patent Application No. 61/672,119, filed on Jul. 16, 2012, the contents of which are incorporated herein in their entirety.

TECHNICAL FIELD

This application relates generally to methods and apparatuses, including computer program products, for providing unified communication services for communication sessions between client devices.

BACKGROUND

Traditional legacy and first generation IP PBX systems have significant challenges in terms of their scalability and redundancy characteristics. For example, such systems only provide for discrete hardware nodes at different locations and, if failure of a single node occurs, the entire system could stop working. Also, the limited feature set and networking capabilities of these systems restrict the amount of available expansion and user mobility. The enormous level of complexity of such legacy systems, combined with the cumbersome hardware requirements, makes them costly to own and maintain and undesirable for a modern IT environment.

Legacy PBX systems grew complex over many years, with different components melded together as new functionality was added, either as new components or layered on top of an existing component. Legacy PBX systems generally were not designed from the ground up. Also, little has changed in the unified communications industry over the last decade. The result of this 'building on top of older systems' was that administrators were left to cope with multiple element managers to manage individual components. Typically each element or component offered by a legacy vendor has its own architecture and history, was developed by a completely different team, or resulted from earlier technology acquisitions. They might run on different operating systems, require different middleware stacks, have independent database requirements, and drive different operating needs. They all come with their individual management interface—an element manager. As complexity grew the need for a manager of managers arose, offering yet another administration interface that only covers a small subset of the manageable functionality of the underlying components. Only highly trained experts can handle such systems, which drives cost up and prevents end users from becoming self-sufficient for moves, adds, and changes.

SUMMARY

The invention, in one aspect, features a computerized system for providing unified communication services for communication sessions between two or more client devices. The system includes a plurality of globally-distributed computing device clusters coupled to each other over a communication network. Each cluster is configured to receive, from a client device, a transaction request associated with a communication session, the transaction request including a presence event. Each cluster comprises a Session Initiation Protocol (SIP) server configured to process the transaction request, an event queue configured to extract the presence event from the transaction request for storage in the event queue, and a session state handler configured to retrieve the presence event from the event queue and notify an Extensible Messaging and Presence Protocol (XMPP) server of the presence event. The SIP server, XMPP server, and session state handler each stores and retrieves data associated with the communication session in a database shard at the cluster. The database shards of each cluster collectively comprise a single logical database.

The invention, in another aspect, features a computerized method for providing unified communication services for communication sessions between two or more client devices. A first one of a plurality of globally-distributed computing device clusters coupled to each other over a communication network receives a transaction request associated with a communication session, the transaction request including a presence event. An event queue at the cluster extracts the presence event from the transaction request for storage in the event queue. A Session Initiation Protocol (SIP) server at the cluster processes the transaction request. A session state handler at the cluster retrieves the presence event from the event queue. The session state handler notifies an Extensible Messaging and Presence Protocol (XMPP) server at the cluster of the presence event. The SIP server, XMPP server, and session state handler each stores and retrieves data associated with the communication session in a database shard at the cluster. The database shards of each cluster collectively comprise a single logical database.

The invention, in another aspect, features a computer program product, tangibly embodied in a non-transitory computer readable storage medium, for providing unified communication services for communication sessions between two or more client devices. The computer program product includes instructions operable to receive, at a first one of a plurality of globally-distributed computing device clusters coupled to each other over a communication network, a transaction request associated with a communication session, the transaction request including a presence event. The computer program product includes instructions operable to extract, by an event queue at the cluster, the presence event from the transaction request for storage in the event queue. The computer program product includes instructions operable to process, by a Session Initiation Protocol (SIP) server at the cluster, the transaction request. The computer program product includes instructions operable to retrieve, by a session state handler at the cluster, the presence event from the event queue. The computer program product includes instructions operable to notify, by the session state handler, an Extensible Messaging and Presence Protocol (XMPP) server at the cluster of the presence event. The SIP server, XMPP server, and session state handler each stores and retrieves data associated with the communication session in a database shard at the cluster. The database shards of each cluster collectively comprise a single logical database.

Any of the above aspects can include one or more of the following features. In some embodiments, the SIP server includes a SIP proxy module and a SIP registrar module for managing a transaction state associated with the communication session. In some embodiments, the communication session is a SIP call. In some embodiments, the transaction state relates to a sequence of SIP messages exchanged between client devices.

In some embodiments, the session state handler notifies the XMPP server of a change in user presence status based on the presence event. In some embodiments, the XMPP server subscribes to receive events from the session state handler. In some embodiments, the presence events relate to availability of a user associated with a client device.

In some embodiments, a communication session being handled by a first cluster is routed automatically to a second cluster upon failure of the first cluster. In some embodiments, failure includes network interruption, software failure or hardware failure. In some embodiments, the system routes traffic associated with the communication sessions using a Domain Name System (DNS) paradigm.

In some embodiments, the database shard stores data associated with establishing and controlling the communication session. In some embodiments, the data includes credentials, permissions, registrations, and aliases. In some embodiments, the data is associated with client devices local to the first cluster. In some embodiments, each database shard maintains data consistency by automatically replicating data with the other database shards. In some embodiments, processing of the transaction request is separate from processing of the presence event.

Other aspects and advantages of the technology will become apparent from the following detailed description, taken in conjunction with the accompanying drawings, illustrating the principles of the technology by way of example only.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

DETAILED DESCRIPTION

The SIP Service Oriented Architecture (SSOA), system described herein and offered by eZuce, Inc. of Andover, Mass., is a 'carrier-class' system that offers the demanding global enterprise a modern, built-for-the-cloud and highly scalable and resilient communications, collaboration and social networking infrastructure designed with native Session Initiation Protocol (SIP) and Extensible Messaging and Presence Protocol (XMPP) at its core. The SSOA system provides a design of flexible software systems with system components that can interoperate as independent services and be provisioned automatically and via Web services. By extending Service Oriented Architecture (SOA) concepts to SIP and real-time communications, and by leveraging Web services interfaces for provisioning and communication between components, the SSOA system brings an innovative approach to communications systems design with lower operating cost.

The SSOA system introduces an IT-based software solution that communications-enables an enterprise's IT infrastructure, eliminates hardware dependency, and offers a significant reduction in complexity and operating costs. The SSOA system addresses the need for scale, resiliency, operating practice, and functionality for the enterprise market, on premises or in the cloud. Global and geo-redundant clusters are deployed and provisioned with ease, with low complexity and cost, as the SSOA is built with a modern cloud infrastructure in mind and from the ground up.

The SSOA system allows enterprises to build a global, fully-redundant system at a high standard and low cost. Performance, resiliency, and scale are combined with ease of installation and administration to render a flexible IT solution. The SSOA system combines technologies such as SIP and XMPP to provide a presence-based user experience, efficient, flexible session routing, load-sharing, load-balancing, seamless redundancy, global extension mobility, ease of use, and significant management and operating efficiency.

The SSOA system allows deploying clusters globally to result in no geographic distance limit between distributed systems. There is also no hierarchy between participating systems: all systems are equal in their ability to authenticate users, register devices and clients, apply permissions, and route sessions. Therefore, each system can take over from any other system in a load-sharing configuration at the transaction level.

Figure 1:
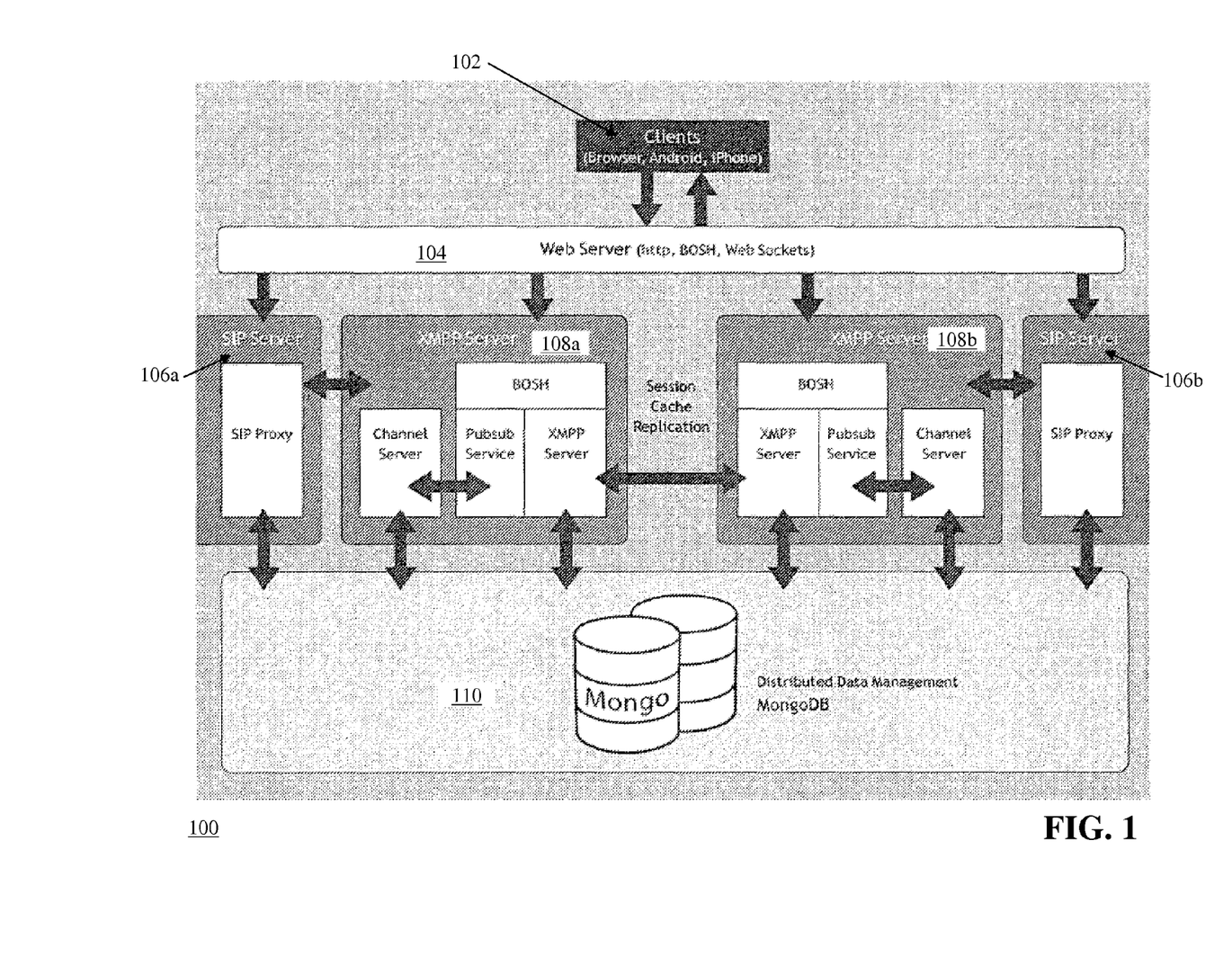
FIG. 1 is a block diagram for providing unified communication services for communication sessions between client devices.

FIG. 1 is a block diagram of a system 100 for providing unified communication services for communication sessions between client devices (i.e., the SSOA system). The system 100 includes client devices 102, a web server 104, SIP servers 106a-b, XMPP servers 108a-b, and a database 110. The client devices 102 are computing devices capable of interacting with the other components of the system 100 via the web server 104. Example computing devices include, but are not limited to, personal computers with web browser software, tablets, smartphones, and the like. In some embodiments, the client devices 102 include software that enables them to initiate and receive SIP-based calls using the system 100.

The web server 104 receives requests from the client devices 102 to log in to the system and access the communication services provided by the system. For example, a user of a client device 102 can navigate a browser to an address associated with the web server 104 and provide security credentials to the web server 104 for access to the system 100. The web server 104 can provide applications (e.g., SIP, chat, messaging) for use in communicating between client devices.

The SIP servers 106a, 106b handle the transfer and management of traffic for SIP-based communication sessions between client devices 102. For example, the SIP server 106a coordinates the setup of SIP calls and routing of the SIP traffic to appropriate locations in the system 100. In some embodiments, the SIP servers 106a, 106b control the authentication and authorization of client devices 102 to access SIP services provided by the system 100. As will be described in greater detail below, the SIP server 106a leverages a DNS-based addressing paradigm to provide increased resilience and capacity of the system 100. For example, a client device 102 that wishes to perform an action (e.g., call, voicemail) communicates with a DNS server (not shown) that provides a list of addresses for SIP servers (e.g., servers 106a, 106b) within the system 100. The client device 102 initiates communication with one of the SIP servers (e.g., 106a), where the server 106a then determines how to route the traffic to service the client device by asking the DNS server for a list of addresses responsive to the action. For example, if the client device 102 wants to register with the system 100, the server 106a would retrieve a list of addresses for registrars in the system 100 and route the registration request to the first registrar. If the server 106a is unable to reach the first registrar (due to network outage, for example), the server 106a simply routes the request to the second registrar. The client device 102 is unaware of the switchover and receives uninterrupted service.

The XMPP servers 108a, 108b handle real-time instant messaging and presence functionality for the system 100. For example, a user at a client device 102 may log in to a chat application via the web server 104 and want to send an instant message to a colleague on his contact list. Upon logging in, the XMPP server 108a records the user's presence information (e.g., 'online,' 'available'). The XMPP server 108a also communicates presence information of the other users in the contact list to the chat application, so that the user at client device 102 can see the status of his contact list. The user at client device 102 can then select a contact and enter an instant message to be delivered via the XMPP server 108a to the contact's client device. The XMPP server 108a includes a pubsub service that subscribes to presence events generated by the client devices 102 and issues notifications to the client devices 102 when presence events related to users are received.

As shown in FIG. 1, the system is comprised of multiple clusters that include a SIP server (e.g., server 106a) and an XMPP server (e.g., server 108a). These clusters (also called branches) are distributed globally and configured to communicate with each other to take advantage of redundancy and data replication while providing service to the client devices 102. The client devices 102 can be assigned to a local cluster for faster and more reliable service, but each cluster is capable of servicing any of the client devices 102 in the event of network downtime or hardware failure at a particular cluster.

The database 110 is distributed in shards across the clusters. For example, each cluster includes a database shard that can store data associated with users and devices 102 that are local to that cluster. Each shard collectively comprises a single logical database, where the data is automatically replicated between shards to ensure that the data is available at all shards. This approach eliminates the bottleneck of having a single database node servicing each cluster and responsible for processing all of the transactions that occur across the entire system 100.

Figure 2:
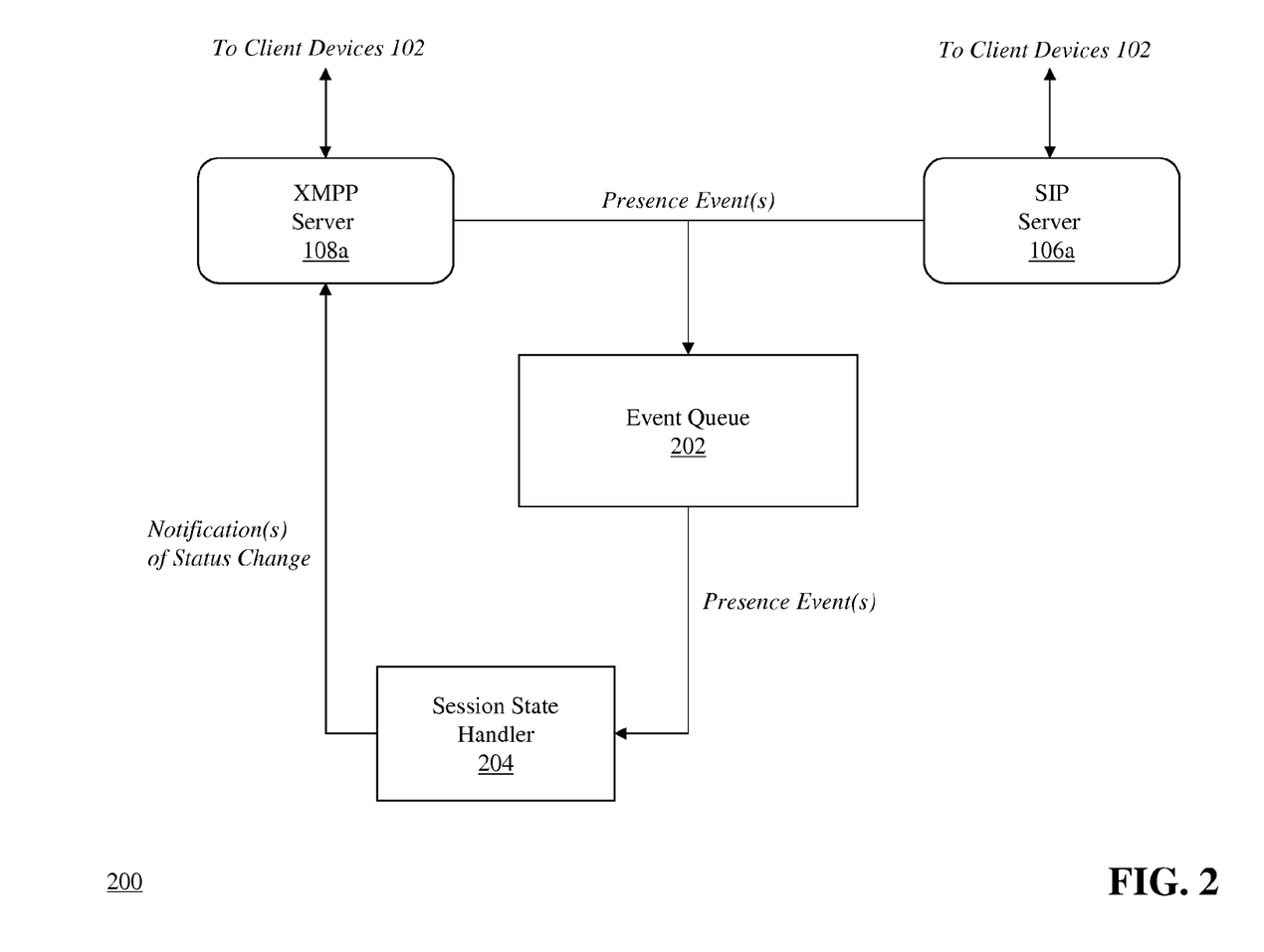
FIG. 2 is a block diagram of a cluster of the system of FIG. 1.

FIG. 2 is a block diagram of a cluster 200 of the system 100 of FIG. 1. As mentioned previously, the cluster 200 includes a SIP server 106a, an XMPP server 108b, and a database shard 110. The cluster 200 also includes an event queue 202 that communicates with the SIP server 106a and the XMPP server 108a for receiving presence events associated with client devices 102 connected to the system. The cluster 200 also includes a session state handler 204 for taking presence events from the event queue 202 and processing the presence events—including notification to the XMPP server 108a of a change in a user's presence status.

For example, as presence events occur at client devices 102 connected to the cluster 200, the SIP server 106a and the XMPP server 108a collect the presence events and transmit the events to the event queue 202. The presence events indicate a change in the availability status of a client device 102. An example presence event is a client device going off-hook (indicating that the user is initiating or participating in a phone call) or a client device setting a chat status to 'do not disturb.' The event queue 202 stores the presence events, for example, as the events arrive at the queue 202. The session state handler 204 retrieves presence events from the queue 202 (e.g., in a first-in-first-out manner) and processes the presence events to notify the XMPP server 108a of the changes in client device status. For example, if the presence event is that a client device 102 went off-hook, the session state handler 204 notifies the XMPP server 108a of the event so that the XMPP server 108a can update the status for that client device 102 to reflect the user's present unavailability. It should be understood that although FIG. 2 depicts one session state handler, the cluster 200 can include a plurality of session state handlers for load-balancing and redundancy purposes without departing from the scope of the invention. In addition, in some embodiments, the event queue 202 and/or the session state handler 204 are distributed in different locations in the system 100 and are not required to be located in the same location as the cluster 200.

Figure 3:
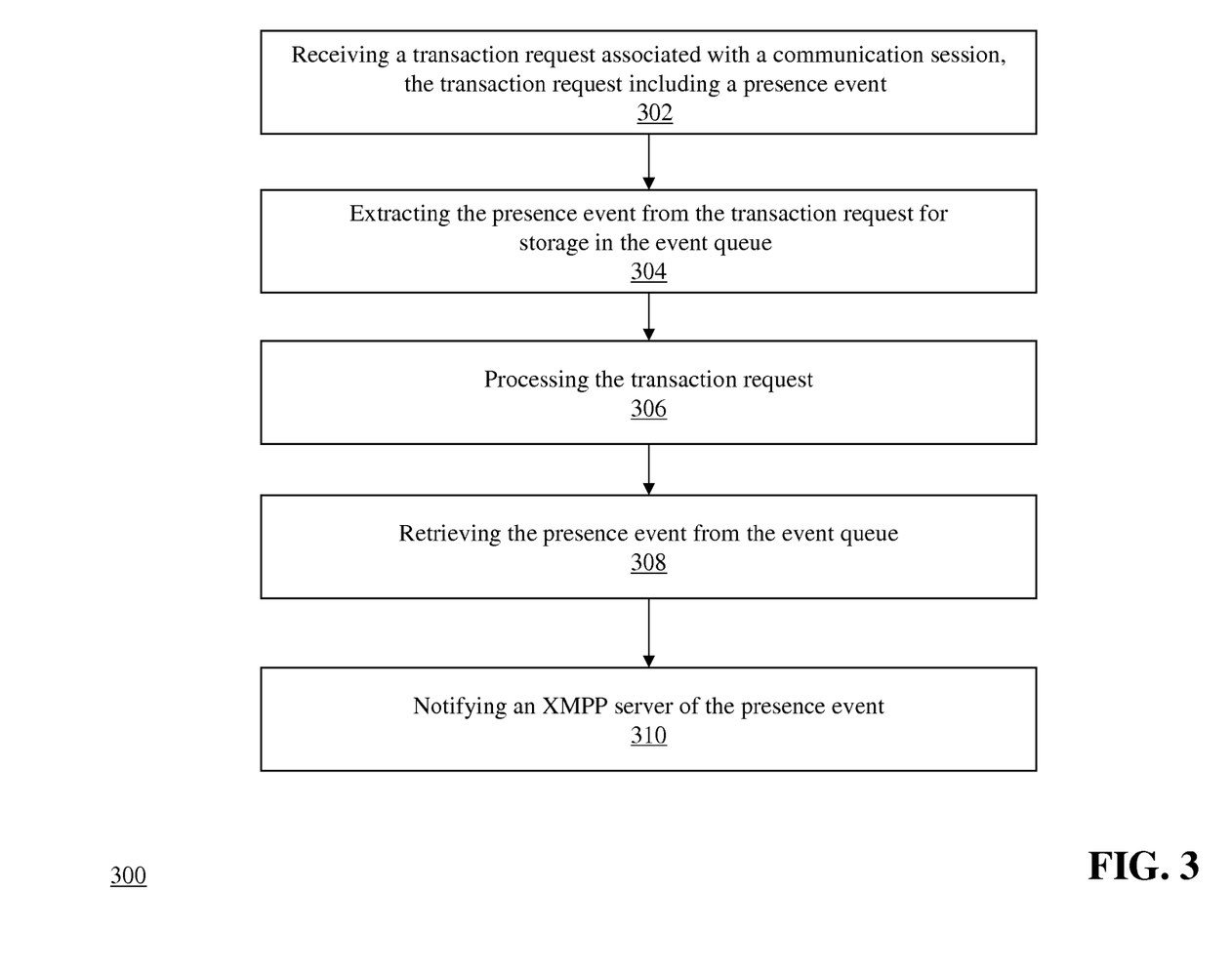
FIG. 3 is a flow diagram of a method for providing unified communication services for communication sessions between client devices.

FIG. 3 is a flow diagram of a method for providing unified communication services for communication sessions between client devices using the system of FIG. 1 and the cluster of FIG. 2. A cluster 200 receives (302) a transaction request associated with a communication session from a client device 102. For example, the client device 102 may transmit a SIP INVITE request to the cluster 200. The transaction request includes a presence event—for a SIP INVITE request, the presence event can be an 'off-hook' event, indicating that the client device 102 is now in use.

An event queue 202 at the cluster 200 extracts (304) the presence event from the transaction request and stores the extracted presence event in the queue 202. A SIP server 106a processes (306) the transaction request. Continuing with the above example, the SIP server 106a receives the SIP INVITE request and determines how to route the request based on information associated with the request (e.g., destination, SDP).

A session state handler 204 at the cluster 200 retrieves (308) the presence event from the event queue 202. For example, the session state handler 204 listens for new events to arrive in the event queue 202 and pulls the events from the queue. The session state handler 204 analyzes the presence event and notifies (310) an XMPP server 108a at the cluster 200 of the presence event. For example, the session state handler 204 informs the XMPP server 108a that the user device 102 is 'off-hook.' As a result, the XMPP server 108a updates a user record associated with the client device 102 in the database shard 110 to indicate that the client device 102 is in use. Other client devices that access the user's record are informed of the update to the user's presence status.

Session Management

The SSOA system 100 described herein transforms traditional SIP call routing offered by legacy IP PBX systems into a resilient and self-healing network service. Branch survivability, scale and resiliency take on a new dimension as Session Management is distributed using a large number of load-sharing nodes in a flat global topology.

Consider IP routing itself, where a network of IP routers provide packet routing along different routes and in a self-healing configuration where, if a router fails, then another one can take its place and re-route traffic dynamically. The SSOA system 100 establishes a distributed SIP Session Management and routing capability in the network, very similar to IP routing itself, having any independent SIP proxy node offer SIP Session Management service in a flat hierarchy, forming a self-healing infrastructure.

The eZuce openUC SIP Session Manager based on the SSOA architecture represents a powerful and elegant implementation. No other product renders the SIP proxy server session or call stateless, enabling seamless load-sharing even across large geographic distances, without the usual complexity and without causing excessive network traffic between nodes when synchronizing state information.

A stateless proxy infrastructure for SIP Session Management is made possible by the separation of session routing from the line state presence functionality, which represents session or call state. The choice of XMPP as the main protocol and mechanism for unified presence helps facilitate this architecture. SIP based session routing operates as a call stateless process holding only transaction state, while call state (such as the line state of a phone or user) is confined to the unified presence infrastructure, called Session State Server (SSS) or session state handler, in the SSOA system 100.

Figure 4:
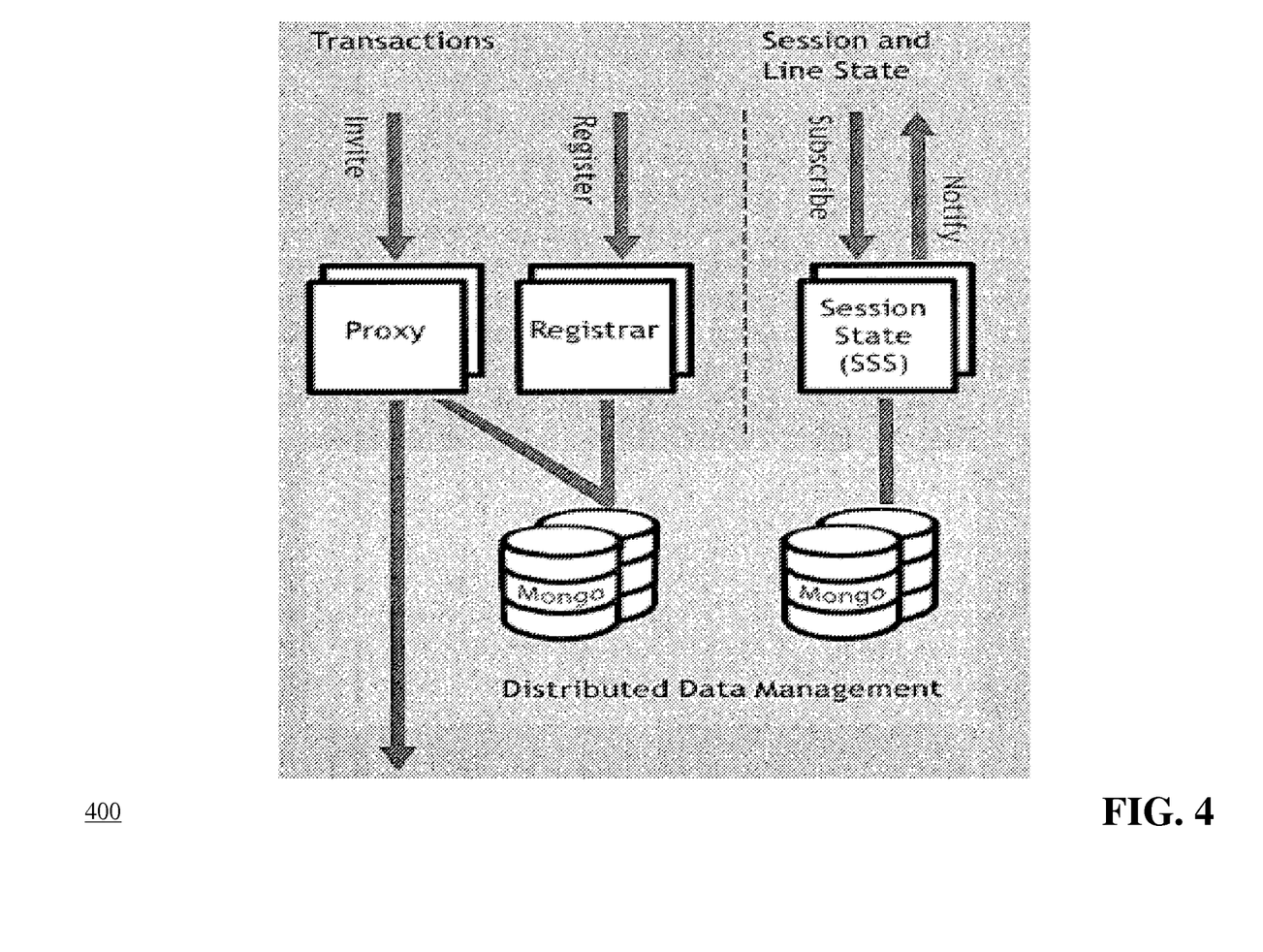
FIG. 4 is a diagram of the separation of SIP-based session routing (i.e., transaction state) from call state routing using the system of FIG. 1 and the cluster of FIG. 2.

FIG. 4 is a flow diagram 400 of the separation of SIP-based session routing (i.e., transaction state) from call state routing using the system 100 of FIG. 1. A SIP transaction is a sequence of SIP messages exchanged between SIP network elements, including the request and all responses to that request. As shown in FIG. 4, SIP requests (e.g., INVITE, Register) and associated responses are separately handled by the SIP proxy and/or SIP registrar that are part of the SIP server 106*a*. However, the SIP call state events (e.g., off-hook) are received by the SSS (e.g., session state handler 204 of FIG. 2) which processes them and notifies the XMPP server of any changes in call state status.

Database

In one exemplary embodiment, the database 110 of the SSOA system 100 uses MongoDB, available from 10gen, Inc., to persistently store all user profile and transaction data in a distributed way. While MongoDB's performance is important to the operation of the SSOA system 100, the database's main benefit for the SSOA system described herein is the horizontal sharding that's part of MongoDB's architecture, which allows horizontal scaling across several clusters. This is called for when you have clusters around the globe and the data needs to be made available to all clusters locally and in a consistent manner. Horizontal sharding allows each SSOA cluster (e.g., cluster 200) to operate globally, without a geographic distance limit, and without a requirement for a centralized database cluster.

Each SSOA cluster runs its own instance (also called a shard) of MongoDB, which optimizes transaction performance and assures data availability at all times. Replication of data with other database shards in other clusters happens automatically in the background and at the database layer, relieving the SSOA application from implementing complex techniques to synchronize its data with other shards in the cluster. The database 110 holds the user's credentials required to authenticate transactions, so it is beneficial to use this data store for the entire user profile. User profile synchronization between different applications was a significant problem, requiring advanced bi-directional data synchronization solutions. Moving all of the user's profile data into the database 110 allows applications to directly access the data, thereby eliminating this need for bi-directional sync. The result is significantly lower cost for application integration.

The database 110 also holds all client registration data and makes it available to all session manager nodes. This allows for seamless failover at the transaction layer and without requiring clients to re-register in a failure case. The effect to the user is completely seamless failover at a regional or global level. Many session manager nodes can participate in such a globally redundant cluster, which allows enterprises to easily build a robust communications backbone that spans the entire enterprise.

Session Routing

The SSOA system 100 described herein leverages a DNS-based infrastructure for domain based routing decisions, load-sharing distribution and fail over redundancy. This strategy removes complexity from the SSOA system and enables a tight integration with the rest of the network and IT infrastructure. Traditional systems typically rely on a heartbeat polling mechanism for redundant systems to stay in touch. If the heartbeat fails, the surviving system knows that its peer has disappeared and takes appropriate action to wake up from hot standby mode and become the active server.

With the SSOA system 100, redundancy is not hot standby but fully load-sharing and dynamic. Failover happens at the transaction level, fully controlled by DNS. No heartbeat mechanism is required and all participating systems are active all the time. When an end device initiates a session, a DNS service record (DNS SRV) lookup is performed. DNS returns one of several possible servers that could handle the. request. The DNS response can be made location-specific to control traffic and load distribution. The end device then initiates the transaction with the first server it received from DNS. If it cannot reach that server the end device retries automatically and instantly using an alternate server.

This retry transaction is instantaneous, happening at the UDP ITCP ITLS transport layer, and therefore it is fully transparent to the user. The DNS mechanism is not only used to load-share among participating session managers, but the same mechanism is also used to locate services that are part of the SSOA system, such as the unified messaging or conferencing services. This enables centralization, transparent load-sharing, and redundancy for all services, including fast disaster recovery. SSOA's domain-based session routing mechanism based on DNS allows for excellent mobility characteristics with optimal flexibility for the administrator to define a dialplan against a global address space, allowing for numeric and non-numeric user IDs and user aliases.

In spite of this global addressing capability, administration remains easily centralized. In a multi-location installation, there is still only one SIP and XMPP domain for the entire enterprise and cluster: typically the main domain of the company. A user can register a phone in any location and all authorization decisions can be made for any service in any location, because the credentials and permissions information is globally available, stored in MongoDB. The universal mobility requirement demands that a user can register anywhere and therefore the user's registration needs to be replicated everywhere. The SSOA design calls for all critical data required at the transaction level, such as credentials, permissions, registrations, and aliases, to be stored in MongoDB with horizontal sharding (automated global replication) built directly into the database layer. The result is a truly global system with unlimited user mobility and roaming.

Figure 5:
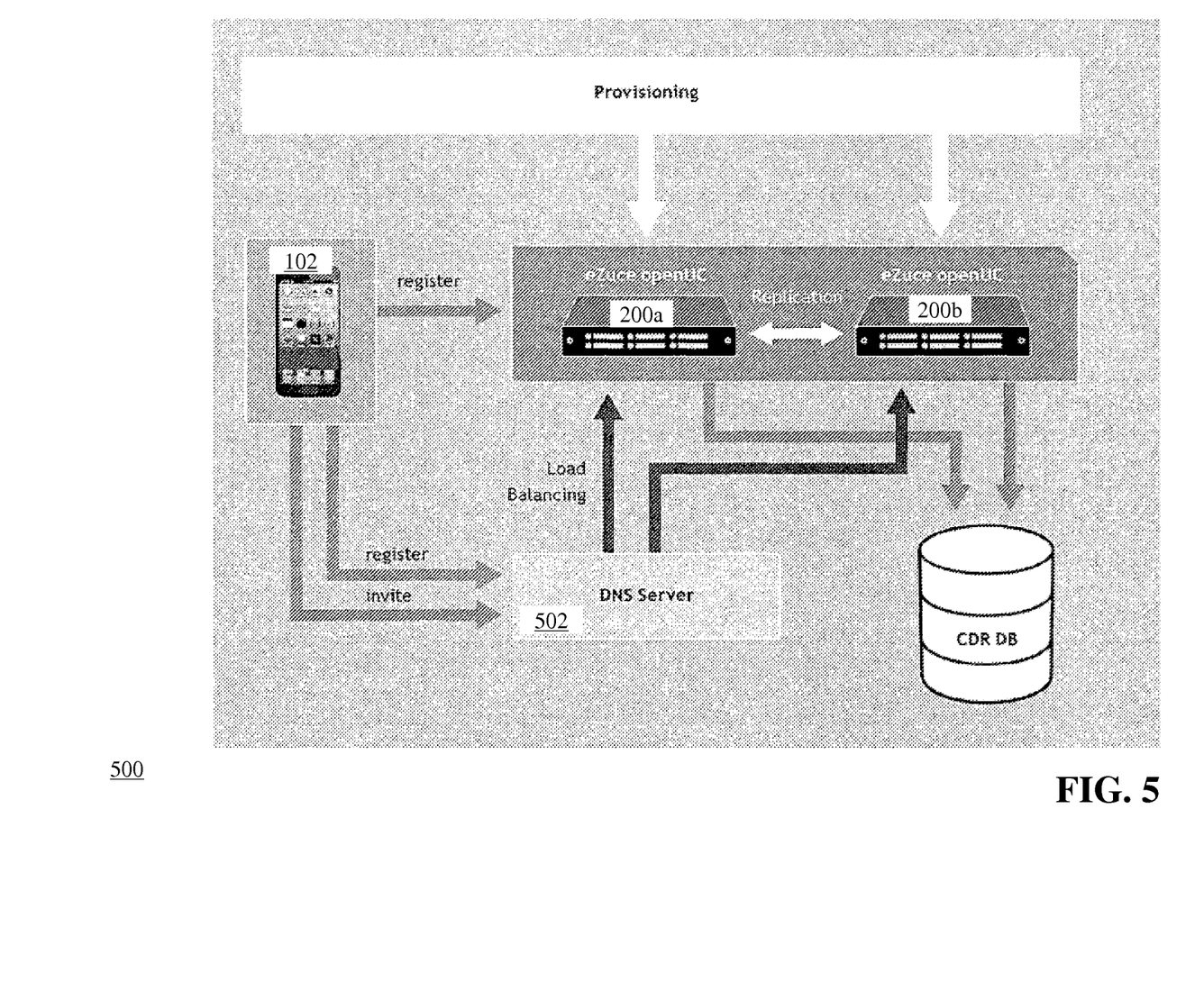
FIG. 5 is a flow diagram of the DNS infrastructure and routing using the system of FIG. 1 and the cluster of FIG. 2.

FIG. 5 is a flow diagram 500 of the DNS infrastructure and routing using the system of FIGS. 1 and 2. As shown in FIG. 5, the client device 102 can communicate directly with a eZuce openUC cluster 200*a* (e.g., for a registration transaction) or the client device 102 can route its requests through a DNS server 502 that is configured to load balance the requests across multiple clusters (e.g., clusters 200*a*, 200*b*). The DNS server 502 can assign a priority to the clusters so that certain traffic (e.g., by type, by originating client device) is routed to a particular cluster.

Enterprise Instant Messaging and Social Networking

Communications and collaboration have changed forever in the last few years. Unified presence introduces an entirely new user experience, allowing improved and more personal interactions that make an organization more productive even beyond the boundaries of the enterprise itself. Unified presence represents a user's ability or willingness to communicate; it consists of the aggregation of different types of presence such as 'available,' 'away,' 'blocked,' 'on the phone,' 'in a meeting,' 'offline,' 'do not disturb,' and the like.

Knowing a user's presence before trying to communicate significantly improves the experience on both sides and allows each party to choose the appropriate means of communications. In today's always-on, mobile and social world it allows users to communicate more efficiently and flexibly.

In addition, Enterprise Instant Messaging (EIM) helps meet the growing need of users for multichannel communication. For instance, a conversation that starts in chat can be escalated to voice or video with a single click. The importance of chat is often underestimated until it is made available, especially within large, distributed organizations.

Presence is also the enabling technology for enterprise social networking. Three basic capabilities are required as a foundation for Enterprise Social Networks (ESNs).

(1) User profile—The first is a user's profile which, in addition to the usual fields, has to be extensible and include customizable information that can be adapted to the enterprises' needs. Users only want to maintain one single profile, so profile information starting with the user's avatar to his or her location and contact information needs to be shared with all applications an enterprise uses for social networking, communication and collaboration.

(2) Relationships—The second is a model of the user's social relationships, aka the social graph. The user's buddy list in a chat client typically represents these relationships and once established these relationships can be extended to followers of the user's activity stream, friends displayed on a profile, and other uses. The user only has to maintain one social graph that is then shared throughout all enterprise applications.

(3) Presence—The third is information about the user's unified presence that can be made available to all applications that display user information, including email, calendar, document management, CRM, and communication and collaboration systems.

A user's profile, social graph, and unified presence can be made available for application integration in many different ways. Traditionally, each application establishes its own user profile which then gets stored in the application's database backend. This approach requires complicated and costly bidirectional sync protocols to keep such profiles synchronized.

The SSOA system 100 described herein introduces a new methodology for profile integration. A user's profile information is stored in the database (e.g., MongoDB) and each application connects directly into the distributed database layer and thereby avoids the need for complicated sync mechanisms. Because MongoDB is a NoSQL database, extensions of the data set are easily possible without having to change a schema. Social graphs are represented by XMPP in the form of a user's roster or buddy list. XMPP enables instant federation, a feature still absent in other enterprise social networking solutions, and it comes with all the sophisticated and mature security available for XMPP. XMPP is the only available and widely used standard protocol to share user relationship information with other applications and between organizations.

Unified presence can be integrated with other applications using different mechanisms. An XMPP client, either native or Web based, has instant real-time access to a user's presence. In addition, presence is available via Web Services (REST) interfaces and also Web Socket APIs. In this way the user's unified presence can be integrated with other social business applications and tools such as for document management and sharing, collaboration, and social Intranet services to form a cohesive, real-time user experience.

Optimizing Voice and Video Quality

Voice over IP (VoIP) is not tolerant of packet loss. Even 1% packet loss can significantly degrade a VoIP call using a G.711 codec and other more compressing codecs can tolerate even less packet loss. For example, the G.729 codec requires packet loss far less than 1 percent to avoid audible errors and ideally there should be no packet loss for VoIP. Jitter has a similar degrading effect on audio quality. Most VoIP endpoint devices have jitter buffers to compensate for network jitter. Jitter buffers, used to compensate for varying delay, further add to the total end-to-end delay, and are usually only effective on delay variations less than 100 ms. Packet loss and jitter must therefore be minimized via proper QoS handling and traffic priorization in the network at both the switching and routing level.

The SSOA system 100 described herein offers greatly improved voice and video quality because there is strict separation of SIP and XMPP signaling from the media path. The voice or video codec used for any given session is dynamically negotiated at connection set up between the participating endpoints. The session manager does not impose any restrictions on what codec the end systems can use. Once the call is set up, media traverses the LAN and is routed peer-to-peer and not through the session manager server. The call server, therefore, is not a single point of failure for media and also is not a bottleneck limiting the maximum number of concurrent sessions. Any number of supported concurrent sessions, voice or video, is allowable, limited only by the available bandwidth in the underlying network.

Peer-to-peer media routing also reduces delay and jitter, the two most important parameters when it comes to voice or video quality. High Definition (HD) voice or video is supported as permitted by the end systems. The administrator can set certain codec selection policies based on available bandwidth or other parameters. High definition audio makes a real difference when it comes to user experience. Users experiencing it for the first time are typically very impressed by its clarity and quality, and they unanimously state that HD audio improves audibility.

Client-specific media, such as screen sharing, Web conferencing, and white-boarding is possible as a client-side-only implementation. The SSOA server is media agnostic and can interoperate with any number of third party clients that implement such specific capabilities.

Service Assurance, Monitoring and Provisioning

Few enterprises or even carriers and major system integrators (SIs) have the a resources or expertise to build a service assurance, service monitoring, and provisioning infrastructure from scratch, especially not if this needs to be done separately for every vendor specific application.

The strategic question carriers and SIs have to answer is how to differentiate their hosting offerings if all players in the market offer the same solution with the same operating model. If the vendor itself then offers its own hosted solution, such as Microsoft Office 365, the question quickly turns into a competitive situation with the vendor and a conflict of interest.

But, instead of spending resources on operationalizing two major vendors' solutions and creating a me-too offering, carriers and SIs should focus on creating an open operating environment that can accommodate as many enterprise applications as possible. The concept of an Enterprise App Store is the natural progression for the IT industry as CIOs are looking to outsource not only operations of individual applications, but the integration of these applications into complete solutions.

As social applications penetrate deeper into the enterprise, integration complexity and costs rise and with that the urge for CIOs to outsource this effort to a carrier or SI, capable to productize the integration. For the carrier and SI the productization of the integration together with the selection of supported applications represents a major opportunity for service differentiation.

The SSOA system 100 described herein is an open system and therefore naturally gravitates to an open operating environment. For service assurance, standard monitoring and reporting applications are used to manage the SSOA system 100 in the same way other IT applications are managed. As an example openNMS offers an FCAP based management solution that heavily leverages SNMP. It includes discovery, inventory, fault and performance management, service management, as well as reporting, event filtering, and alarming. openNMS is open source and designed to manage the entire infrastructure from the network up to the compute infrastructure and the application layer.

Service Management (SM) is based on RFCs 3611 and 6035 and the RTCP-XR protocol and metrics for call quality. Enterprise network managers need a more comprehensive approach to VoIP management. One of the foundations of such an approach is the IETF's RFC 3611, the Real-Time Control Protocol Reporting Extensions (RTCP-XR). Published in November 2003, RTCP-XR is the first standardized protocol to provide a comprehensive set of VoIP-related performance metrics. RTCPXR is designed to be implemented as a software agent in IP phones, gateways, and media servers. Many devices support RFC 3611 and RTCP-XR, including Polycom phones with the Polycom Productivity Suite, Audiocodes gateways, Counterpath softphones, Snom, and also phones from Cisco and Nortel. Different standard solutions exist to collect RTCP-XR information and generate reports, including Telchemy's SQmediator.

Once the decision is taken in favor of an open operating environment, application integration becomes a lot easier. All applications can now be produced in the same operating environment and application integration is reduced to bringing specific functionality from one application into another. An excellent and high value example of this is communications enablement of applications using Web Services API.

Security

With the wide variety of client devices and social communications trends come new concerns over security for IT professionals, now tasked with managing a multitude of outside devices and external touch points. The SSOA system 100 described herein offers comprehensive security at various layers of the system, as expected from a system designed for large enterprise and cloud deployments:

(1) Secure connections—at the connection layer, the SSOA system 100 is designed with secure connections using encrypted signaling over TLS for both the SIP and XMPP protocols. Media can be encrypted end-to-end using SRTP dependent on the end point's capabilities. Instant Messaging (IM) and presence exchanges run over encrypted TLS. Web based clients connect via HTTPS over secured connections that require authentication.

(2) Authentication—all external calls are challenged and require proper authentication and authorization. SIP passwords are auto-generated to comply with strict password security policies, and kept separate from all other passwords in the system.

(3) Policy—user credentials management can be integrated within the enterprise directory service, either Active Directory (AD) or other LDAP based directory. Established enterprise password policies apply and user and credentials management remains centralized.

(4) Certificates—cluster nodes are connected to the centralized management system via secured connections. Certificate administration and deployment is automated for ease of use. Each node auto-deploys an iptables based firewall for secure and controlled access to the services it provides.

(5) Border security—for maximum security the SSOA system 100 interoperates with Session Border Controllers (SBC) from a variety of vendors, including ACME Packet, Cisco, and Ingate. Deploying a SBC allows for deep packet inspection to prevent attacks from the outside, including Denial of Service (DoS) attacks. For remote workers VPN connections are an option, but not necessarily required relying on security provide by the SBC combined with encrypted connections for both signaling and media.

The SSOA system 100 described herein is ready for directory based enterprise single sign-on mechanisms and technologies, including Kerberos and two factor authentication systems, including support for multiple LDAP domains. As the world of end-user behaviors grows ever more complex, the SSOA system grows with the challenges, maintaining robust security against existing and emerging threats, for greater IT peace of mind and efficacy in preventing security breaches.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3 GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

The invention claimed is:

1. A computerized system for providing unified communication services for communication sessions between two or more client devices, the system comprising:
    a Domain Name System (DNS) server coupled to a plurality of globally-distributed computing device clusters which are coupled to each other over a communication network, the DNS server configured to:
    receive, from a client device, a transaction request associated with a communication session, the transaction request including a transaction state of the communication session and a call state presence event corresponding to the transaction request and independent of the transaction state; and
    determine one of the plurality of globally-distributed computing device clusters that is capable of handling the transaction request according to a current load and a capability set of the cluster, and transmitting the transaction request to the determined cluster;
    wherein each cluster comprises:
        a Session Initiation Protocol (SIP) server configured to process the transaction request and including a SIP proxy module and a SIP registrar module for managing the transaction state associated with the communication session, the transaction state corresponding to a sequence of SIP messages exchanged between the client device and other SIP network elements,
        an event queue configured to extract the call state presence event from the transaction request for storage in the event queue, the event queue further storing messaging presence events received from an Extensible Messaging and Presence Protocol (XMPP) server of the determined cluster, the messaging presence events corresponding to availability status of a client device for non-call messaging, and a session state handler configured to retrieve the most current presence event from the event queue and notify either the SIP server or the XMPP server of the retrieved presence event;

wherein the SIP server, XMPP server, and session state handler each stores and retrieves data associated with the communication session in a database shard at the determined cluster;

wherein the database shards of each cluster collectively comprise a single logical database; and wherein the SIP server manages the transaction state separately from the session state handler retrieving the most current presence event and notifying either the SIP server or the XMPP server of the retrieved presence event.

2. The system of claim 1, wherein the communication session is a SIP call.

3. The system of claim 1, wherein the session state handler notifies the XMPP server of a change in user presence status based on the call state presence event and the session state handler notifies the SIP server of a change in user presence status based on the messaging presence event.

4. The system of claim 3, wherein the XMPP server subscribes to receive call state presence events from the session state handler.

5. The system of claim 1, wherein the presence events relate to availability of a user associated with a client device.

6. The system of claim 1, wherein a communication session being handled by the determined cluster is routed automatically to a second cluster upon failure of the determined cluster.

7. The system of claim 6, wherein failure includes network interruption, software failure or hardware failure.

8. The system of claim 1, wherein the database shard stores data associated with establishing and controlling the communication session.

9. The system of claim 8, wherein the data includes credentials, permissions, and aliases.

10. The system of claim 9, wherein the data is associated with client devices local to the determined cluster.

11. The system of claim 1, wherein each database shard maintains data consistency by automatically replicating data with the other database shards.

12. A computerized method for providing unified communication services for communication sessions between two or more client devices, the method comprising:

receiving, at a Domain Name System (DNS) server coupled to one or more of a plurality of globally-distributed computing device clusters which are coupled to each other over a communication network, a transaction request associated with a communication session, the transaction request including a transaction state of the communication session and a call state presence event corresponding to the transaction request and independent of the transaction state;

determining, by the DNS server, one of the plurality of globally-distributed computing device clusters that is capable of handling the transaction request according to a current load and a capability set of the cluster, and transmitting the transaction request to the determined cluster;

extracting, by an event queue at the determined cluster, the call state presence event from the transaction request for storage in the event queue, the event queue further storing messaging presence events received from an Extensible Messaging and Presence Protocol (XMPP) server of the determined cluster, the messaging presence events corresponding to availability status of a client device for non-call messaging;

processing, by a Session Initiation Protocol (SIP) server at the determined cluster, the transaction request, the SIP server including a SIP proxy module and a SIP registrar module for managing the transaction state associated with the communication session, the transaction state corresponding to a sequence of SIP messages exchanged between the client device and other SIP network elements;

retrieving, by a session state handler at the determined cluster, the most current presence event from the event queue;

notifying, by the session state handler, either the SIP server or the XMPP server the retrieved presence event;

wherein the SIP server, XMPP server, and session state handler each stores and retrieves data associated with the communication session in a database shard at the determined cluster;

wherein the database shards of each cluster collectively comprise a single logical database; and wherein the SIP server manages the transaction state separately from the session state handler retrieving the call state presence event and notifying the XMPP server of the call state presence event.

13. The method of claim 12, wherein the communication session is a SIP call.

14. The method of claim 12, further comprising transmitting, by the session state handler, a notification message to the XMPP server indicating a change in user presence status based on the call state presence event and transmitting, by the session state handler, a notification message to the SIP server indicating a change in user presence status based on the messaging presence event.

15. The method of claim 14, wherein the transmission of the notification message to the XMPP server is based on a subscription of the XMPP server to receive call state presence events from the session state handler.

16. The method of claim 12, wherein the presence events relate to availability of a user associated with a client device.

17. The method of claim 12, further comprising automatically routing, by the determined cluster, a communication session to a second cluster upon failure of the determined cluster.

18. The method of claim 17, wherein failure includes network interruption, software failure or hardware failure.

19. The method of claim 12, further comprising storing, by the database shard of the determined cluster, data associated with establishing and controlling the communication sessions.

20. The method of claim 19, wherein the data includes credentials, permissions, and aliases.

21. The method of claim 20, wherein the data is associated with client devices local to the determined cluster.

22. The method of claim 12, wherein each database shard maintains data consistency by automatically replicating data with the other database shards.

23. A computer program product, tangibly embodied in a non-transitory computer readable storage medium, for providing unified communication services for communication sessions between two or more client devices, the computer program product including instructions operable to:

receive, at a Domain Name System (DNS) server coupled to one or more of a plurality of globally-distributed computing device clusters which are coupled to each other over a communication network, a transaction request associated with a communication session, the transaction request including a transaction state of the communication session and a call state presence event corresponding to the transaction request and independent of the transaction state;

determine, by the DNS server, one of the plurality of globally-distributed computing device clusters that is capable of handling the transaction request according to a current load and a capability set of the cluster, and transmitting the transaction request to the determined cluster;

extract, by an event queue at the determined cluster, the call state presence event from the transaction request for storage in the event queue, the event queue further storing messaging presence events received from an Extensible Messaging and Presence Protocol (XMPP) server of the determined cluster, the messaging presence events corresponding to availability status of a client device for non-call messaging;

process, by a Session Initiation Protocol (SIP) server at the determined cluster, the transaction request, the SIP server including a SIP proxy module and a SIP registrar module for managing the transaction state associated with the communication session, the transaction state corresponding to a sequence of SIP messages exchanged between the client device and other SIP network elements;

retrieve, by a session state handler at the determined cluster, the most current presence event from the event queue;

notify, by the session state handler, either the SIP server or the XMPP server of the retrieved presence event;

wherein the SIP server, XMPP server, and session state handler each stores and retrieves data associated with the communication session in a database shard at the determined cluster;

wherein the database shards of each cluster collectively comprise a single logical database; and wherein the SIP server manages the transaction state separately from the session state handler retrieving the call state presence event and notifying the XMPP server of the call state presence event.

\* \* \* \* \*